(12) United States Patent
Chen et al.

(10) Patent No.: US 12,317,965 B2
(45) Date of Patent: Jun. 3, 2025

(54) QUICK-RELEASE ASSEMBLY AND VIRTUAL REALITY DEVICE

(71) Applicants: Fuzhou BOE Optoelectronics Technology Co., Ltd., Fujian (CN); BOE Technology Group Co., Ltd., Beijing (CN)

(72) Inventors: Ming Chen, Beijing (CN); Nani Liu, Beijing (CN); Liri Chen, Beijing (CN); Jie Liu, Beijing (CN); Hongyu Zhao, Beijing (CN); Hui Yu, Beijing (CN); Yuhang Lin, Beijing (CN); Xiaoyan Tu, Beijing (CN); Han Zhang, Beijing (CN); Long Hu, Beijing (CN); Chengkun Liu, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 764 days.

(21) Appl. No.: 17/626,465

(22) PCT Filed: Apr. 8, 2021

(86) PCT No.: PCT/CN2021/085916
§ 371 (c)(1),
(2) Date: Jan. 11, 2022

(87) PCT Pub. No.: WO2021/227709
PCT Pub. Date: Nov. 18, 2021

(65) Prior Publication Data
US 2022/0295949 A1   Sep. 22, 2022

(30) Foreign Application Priority Data
May 9, 2020 (CN) .......................... 202010384927.5

(51) Int. Cl.
*A44B 13/00* (2006.01)
*G06F 1/16* (2006.01)

(52) U.S. Cl.
CPC .......... *A44B 13/0035* (2013.01); *G06F 1/163* (2013.01)

(58) Field of Classification Search
CPC ...... A44B 13/0035; G02B 27/01; G06F 1/163
See application file for complete search history.

(56) References Cited

U.S. PATENT DOCUMENTS 11,425,829 B2 * 8/2022 Zheng .................... G02B 7/023
2004/0008158 A1   1/2004 Chi et al.
(Continued)

FOREIGN PATENT DOCUMENTS

CN   201177703 Y   1/2009
CN   206268726 U   6/2017
(Continued)

OTHER PUBLICATIONS

CN202010384927.5 first office action.

*Primary Examiner* — Dmitriy Bolotin
(74) *Attorney, Agent, or Firm* — IPro, PLLC (57) ABSTRACT

A quick-release assembly includes an installation main body and a quick-release clamping plate, the installation main body is provided with a groove structure, the groove structure is provided with a first clamping hole and a second clamping hole that are oppositely arranged, and a portion of the second clamping hole is located on a side wall of the groove structure; the quick-release clamping plate matches the groove structure, and a first clamping hook and a second clamping hook are provided on the quick-release clamping plate; the installation main body is provided with a sliding block installed on the installation main body in a sliding manner; an elastic member for providing a driving force for the sliding block is also arranged in the installation main (Continued)

body; and a quick-release button for releasing a locking state of the sliding block is also arranged in the installation main body.

14 Claims, 6 Drawing Sheets

(56) References Cited

U.S. PATENT DOCUMENTS

| | | | | |
|---|---|---|---|---|
| 2015/0219901 | A1* | 8/2015 | Morimoto | G02B 27/0176 |
| | | | | 345/8 |
| 2018/0203240 | A1 | 7/2018 | Jones et al. | |
| 2018/0321707 | A1* | 11/2018 | Hu | G02B 27/0176 |
| 2019/0159354 | A1* | 5/2019 | Zheng | A42B 1/24 |
| 2020/0271939 | A1* | 8/2020 | Hegge | G03B 17/563 |
| 2020/0400274 | A1 | 12/2020 | Xu et al. | |

FOREIGN PATENT DOCUMENTS

| | | |
|---|---|---|
| CN | 206863338 U | 1/2018 |
| CN | 107985619 A | 5/2018 |
| CN | 108761800 A | 11/2018 |
| CN | 208190786 U | 12/2018 |

* cited by examiner

QUICK-RELEASE ASSEMBLY AND VIRTUAL REALITY DEVICE

CROSS REFERENCE TO RELATED APPLICATIONS

This application is a National Stage of International Application No. PCT/CN2021/085916, filed on Apr. 8, 2021, which claims priority to Chinese patent application No. 202010384927.5, filed with the China National Intellectual Property Administration on May 9, 2020, and entitled "Quick-Release Assembly and Virtual Reality Device", both of which are hereby incorporated by reference in their entireties.

FIELD

The present application relates to the technical field of virtual reality devices, and particularly to a quick-release assembly and a virtual reality device.

BACKGROUND

The virtual reality technology is a computer simulation system capable of creating and experiencing a virtual world, uses a computer to generate a simulation environment, and is a system simulation of multi-source information fused and interactive three-dimensional dynamic scene and entity behaviors, so that a user can be immersed in the environment. A virtual reality head-mounted display device is called virtual reality device for short, is generally worn on the head of a human body through a head-mounted apparatus, and guides the user to generate a feeling that the body is in a virtual environment through closing of the visual sense and the auditory sense of the human to the outside. Therefore, the head-mounted apparatus is a bridge for connecting the virtual reality device and the human body. With the development of the technology, the virtual reality device as a high-tech enters the life of common consumers, and plays an important role in aspects of entertainment, medical treatment, teaching, business and the like.

However, the head-mounted apparatus and a virtual reality device main body are fixed together in a commercially available product, so that the size of the apparatus is increased, and production, packaging and transportation of the virtual reality device are not facilitated. Meanwhile, the head-mounted apparatus is fixed to the device, and the adjustment range of the head-mounted apparatus is limited, so that matching of different head shapes and facial shapes of all users is difficult to meet. When the user uses the virtual reality device, the head-mounted apparatus and the virtual reality device main body are very inconvenient to disassemble, assemble and adjust.

SUMMARY

The present application provides a quick-release assembly and a virtual reality device, and by simplifying the structure of the quick-release assembly, quick assembly and disassembly between connected main bodies using the quick-release assembly are facilitated.

In order to achieve the above purpose, the present application provides following technical solution.

A quick-release assembly includes: an installation main body and a quick-release clamping plate, one of the installation main body and the quick-release clamping plate is configured to be connected with a first main body, and the other one is configured to be connected with a second main body; the installation main body is provided with a groove structure, at least one first clamping hole is formed in a first side of the groove structure in a first direction, at least one second clamping hole is formed in a second side opposite to the first side of the groove structure in the first direction, and a portion of the second clamping hole is located on a side wall of the groove structure; the quick-release clamping plate matches the groove structure, a first clamping hook matching the first clamping hole is formed on a first side of the quick-release clamping plate, and a second clamping hook corresponding to the second clamping hole in shape is formed on a second side opposite to the first side of the quick-release clamping plate; the installation main body is provided with a sliding block installable on the installation main body in a sliding manner in the first direction, the sliding block has a locking station and an unlocking station, at the locking station, the sliding block extends into the groove structure from the portion of the second clamping hole located on the side wall of the groove structure to be in clamping fit with the second clamping hook, and at the unlocking station, the sliding block moves out of the groove structure from the second clamping hole; the installation body is also provided with an elastic member butting between the sliding block and the installation body, and the elastic member is configured to provide a driving force for the sliding block to be switched from the unlocking station to the locking station; the installation body is also provided with a quick-release button capable of sliding in a second direction perpendicular to a groove bottom of the groove structure, and the quick-release button is configured to push the sliding block to be switched from the locking station to the unlocking station.

In the quick-release assembly, the quick-release assembly includes the installation main body and the quick-release clamping plate, one of the installation main body and the quick-release clamping plate is configured to be connected with the first main body, and the other one is configured to be connected with the second main body. When the connection relationship between the first main body and the second main body needs to be released, a user can press the quick-release button, so that the quick-release button slides in the second direction, and pushes the sliding block to be switched from the locking station to the unlocking station. In the process that the sliding block is switched from the locking station to the unlocking station, the portion of the sliding block located in the groove structure gradually moves out of the groove structure through the portion of the second clamping hole located on the side wall of the groove, and at this moment, the locking relationship between the sliding block and the second clamping hook is released. When the first main body and the second main body need to be connected, the first clamping hook of the quick-release clamping plate can extend into the first clamping hole of the installation main body, then the second clamping hook can extend into the second clamping hole in one-to-one correspondence thereto, and after the second clamping hook is placed in place, the elastic member drives the sliding block to be switched from the unlocking station to the locking station. In the process that the sliding block is switched from the unlocking station to the locking station, the sliding block slides in the direction from the second clamping hole to the first clamping hole, and the portion of the sliding block facing the second clamping hole gradually extends into the groove structure from the outer side of the groove structure through the portion of the second clamping hole located on the side wall of the groove until the sliding block is in clamping fit with the second clamping hook.

The quick-release assembly provided by the present application is simple in structure and firm in clamping-fit. When the quick-release assembly is used, a user can release locking between the first main body and the second main body only by lightly pressing the quick-release button, so that the first main body and the second main body can be quickly and conveniently assembled and disassembled, and the quick-release assembly is convenient and quick to use and convenient to store.

Therefore, by simplifying the structure of the quick-release assembly, quick assembly and disassembly between connected main bodies using the quick-release assembly are facilitated.

In some embodiments, a quick-release clamping hook is formed on a side of the sliding block facing the second clamping hole, the quick-release clamping hook includes a first contact face and a second contact face, the first contact face is an inclined plane, a distance between the first contact face and the second contact face is gradually increased along a direction from the first clamping hole to the second clamping hole, and the second contact face forms a clamping surface for clamping the second clamping hook.

In some embodiments, an installation column extending in the second direction is formed on the installation main body, a sliding groove extending in the first direction is formed for the quick-release sliding block, and the quick-release sliding block is installable on the installation column in a sliding manner in the first direction through the sliding groove.

In some embodiments, a screw is installed at an end of the installation column facing away from the installation main body, a surface of a side of a screw cap of the screw facing the installation column forms a limiting face for preventing the sliding block from being disengaged from the installation column, and a gap is reserved between the limiting face and the sliding block at the locking station.

In some embodiments, the elastic member is a spring, a limiting column extending in the first direction is formed on the installation main body, an end of the spring sleeves the limiting column, and another end of the spring is butted against the sliding block.

In some embodiments, when the sliding block is at the locking station, the spring is in an energy storage state.

In some embodiments, a containing cavity is formed for the sliding block, a limiting protrusion is formed at a bottom of the containing cavity, an end of the spring sleeves the limiting column, and another end of the spring sleeves the limiting protrusion.

In some embodiments, a guide column and a button hole are formed on the installation main body, the quick-release button is installable on the guide column in a sliding manner in the second direction, the quick-release button partially extends out of the button hole, the quick-release button has a pressed state and a released state, and when the quick-release button is in the pressed state, the sliding block is at the unlocking station.

In some embodiments, a first guide face is formed on a side of the quick-release button facing the sliding block, a surface of the sliding block facing the quick-release button forms a second guide face facing the first guide face, and when the quick-release button is switched between the pressed state and the lifted state in the second direction, the quick-release sliding block slides in the first direction.

The present application further provides a virtual reality device, including a virtual reality device main body, a wearable apparatus and any one quick-release assembly provided in the above technical solution, the quick-release assembly includes an installation main body and a quick-release clamping plate, one of the installation main body and the quick-release clamping plate is configured to be connected with the virtual reality device main body, and the other one is configured to be connected with the wearable apparatus.

Reference signs: 1—virtual reality device main body; 11—installation main body; 111—groove structure; 1111—first clamping hole; 1112—second clamping hole; 112—installation column; 113—limiting column; 114—guide column; 115—button hole; 2—wearable apparatus; 21—quick-release clamping plate; 211—first clamping hook; 212—second clamping hook; 22—screw; 23—through hole; 24—fixing column; 3—sliding block; 31—first contact face; 32—second contact face; 33—sliding groove; 34—second guide face; 4—elastic member; 5—quick-release button; 51—first guide face; and 6—screw.

DETAILED DESCRIPTION OF EMBODIMENTS

The technical solution in embodiments of the present application will be clearly and completely described in combination with the accompanying drawings in embodiments of the present application, and obviously, the described embodiments are only part of embodiments of the present application, not all embodiments. Based on embodiments in the present application, all other embodiments obtained by those ordinary skilled in the art without paying creative efforts belong to the scope of protection of the present application.

Figure 1:
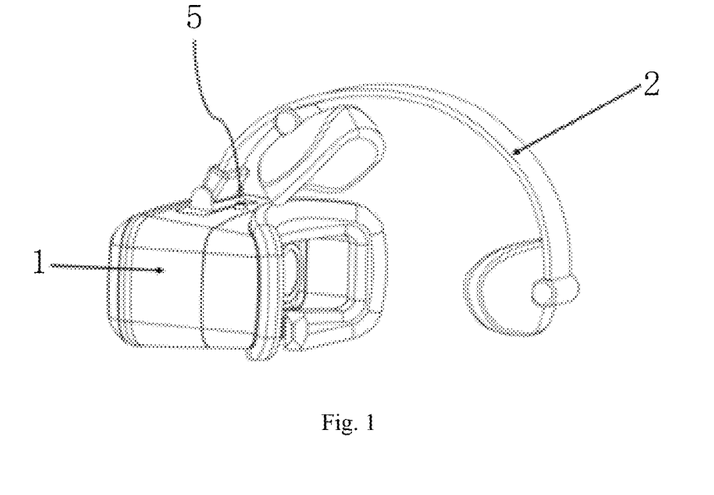
FIG. 1 is a structural schematic diagram of a virtual reality device provided by an embodiment of the present application.
Figure 2:
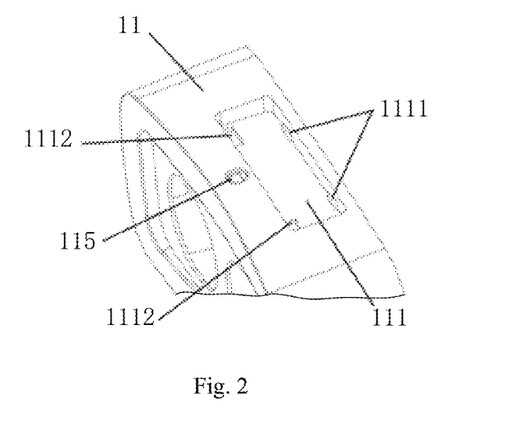
FIG. 2 is a structural schematic diagram of a virtual reality device main body and part of a quick-release assembly in FIG. 1.
Figure 3:
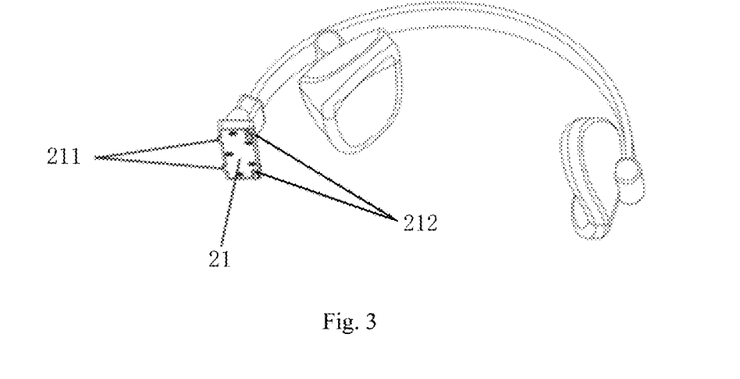
FIG. 3 is a structural schematic diagram of a wearable apparatus and part of the quick-release assembly in FIG. 1.
Figure 4:
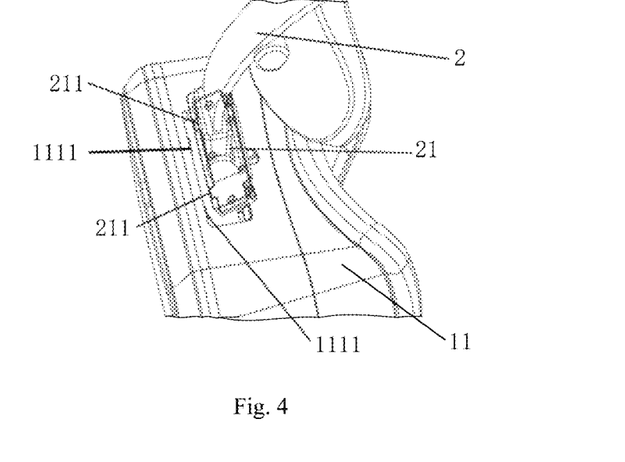
FIG. 4 is an assembly schematic diagram of a wearable apparatus and a virtual reality device main body in a virtual reality device provided by an embodiment of the present application.

In one aspect, the present application provides a virtual reality device, as shown in FIG. 1, the virtual reality device includes a virtual reality device main body 1, a wearable apparatus 2 and any one of quick-release assemblies provided in the following technical solution. Referring to FIG. 2, FIG. 3 and FIG. 4, the quick-release assembly includes an installation main body 11 and a quick-release clamping plate 21, one of the installation main body 11 and the quick-release clamping plate 21 is used for being connected with the virtual reality device main body 1, and the other one is used for being connected with the wearable apparatus 2.

According to the virtual reality device provided by the present application, various wearable apparatuses with different sizes and different functions can be provided for a user, so that the user can quickly and conveniently install and use the device by himself/herself. The user can quickly assemble and disassemble the virtual reality device main body 1 and the wearable apparatus through the quick-release assembly.

It should be noted that the wearable apparatus 2 in the technical solution may be a head-mounted apparatus. Of course, the wearable apparatus may also be other wearable apparatuses, which will not be repeated herein.

It should be noted that each of the first main body and the second main body may be an apparatus that requires quick-release connection. When the quick-release assembly provided by the present application is applied to a virtual reality device, the first main body may be a virtual reality device main body 1, the second main body may be a wearable apparatus 2, or, the first main body may be the wearable apparatus 2, and the second main body may be the virtual reality device main body 1. In order to conveniently introduce embodiments of the present application, description is made by taking the first main body being the virtual reality device main body 1 and the second main body being the wearable apparatus 2 as an example.

In another aspect, the present application provides a quick-release assembly, referring to FIG. 1 and FIG. 4, including: an installation main body 11 and a quick-release clamping plate 21, the installation main body 11 is used for being connected with a virtual reality device main body 1, and the quick-release clamping plate 21 is used for being connected with a wearable apparatus 2.

Continuing to refer to FIG. 2, the installation main body 11 is provided with a groove structure 111, at least one first clamping hole 1111 is formed in a first side of the groove structure 111 in the first direction, at least one second clamping hole 1112 is formed in a second side opposite to the first side of the groove structure 111 in the first direction, and a portion of the second clamping hole 1112 is located on a side wall of the groove structure 111.

The quick-release clamping plate 21 matches the groove structure 111, a first clamping hook 211 matching the first clamping hole 1111 is formed on a first side of the quick-release clamping plate 21, and a second clamping hook 212 corresponding to the second clamping hole 1112 in shape is formed on a second side opposite to the first side of the quick-release clamping plate 21, as shown in FIG. 3.

The installation main body 11 is provided with a sliding block 3 installable on the installation main body 11 in a sliding manner in the first direction, the sliding block 3 has a locking station and an unlocking station. At the locking station, the sliding block 3 extends into the groove structure 111 from the portion of the second clamping hole 1112 located on the side wall of the groove structure 111 to be in clamping fit with the second clamping hook 212, and at the unlocking station, the sliding block 3 moves out of the groove structure 111 from the second clamping hole 1112.

Figure 6:
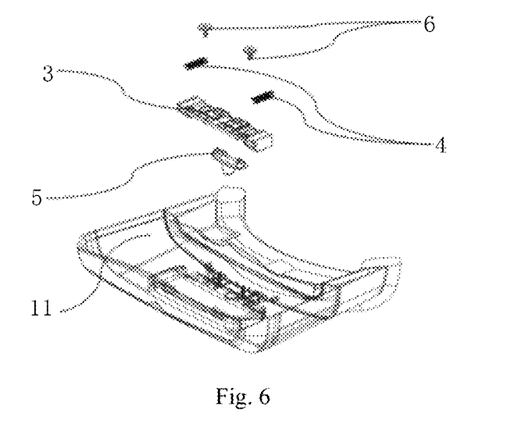
FIG. 6 is a structural schematic diagram of part of the quick-release assembly in FIG. 1.
Figure 9:
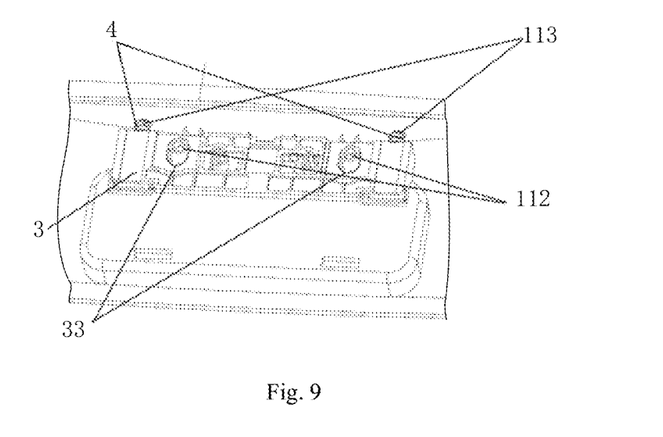
FIG. 9 is a structural schematic diagram of a quick-release assembly provided by an embodiment of the present application.

The installation body 11 is also provided with an elastic member 4 butting between the sliding block 3 and the installation body 11, and as shown in FIG. 6 and FIG. 9, the elastic member 4 is used for providing a driving force for the sliding block 3 to be switched from the unlocking station to the locking station.

The installation body 11 is also provided with a quick-release button 5 installable on the installation main body 11 in a sliding manner in a second direction perpendicular to a groove bottom of the groove structure 111, and the quick-release button 5 is used for pushing the sliding block 3 to be switched from the locking station to the unlocking station.

In the quick-release assembly, the quick-release assembly includes the installation main body 11 and the quick-release clamping plate 21, the installation main body 11 is used for being connected with the virtual reality device main body 1, and the quick-release clamping plate 21 is used for being connected with the wearable apparatus 2. When the connection relationship between the wearable apparatus 2 and the virtual reality device main body 1 needs to be released, the user can press the quick-release button 5, so that the quick-release button 5 slides in the second direction, and the sliding block 3 is pushed to be switched from the locking station to the unlocking station. In the process that the sliding block 3 is switched from the locking station to the unlocking station, the portion of the sliding block 3 located in the groove structure 111 gradually moves out of the groove structure 111 through the portion of the second clamping hole 1112 located on the side wall of the groove structure, and at this moment, the locking relationship between the sliding block 3 and the second clamping hook 212 is released. When the wearable apparatus 2 needs to be connected with the virtual reality device main body 1, the first clamping hook 211 of the quick-release clamping plate 21 can extend into the first clamping hole 1111 of the installation main body 11, then the second clamping hook 212 can extend into the second clamping hole 1112 in one-to-one correspondence thereto, and after the second clamping hook 212 is placed in place, the elastic member 4 drives the sliding block 3 to be switched from the unlocking station to the locking station. In the process that the sliding block 3 is switched from the unlocking station to the locking station, the sliding block 3 slides in a direction from the second clamping hole 1112 to the first clamping hole 1111, and the portion of the sliding block 3 facing the second clamping hole 1112 gradually extends into the groove structure 111 from the outer side of the groove structure 111 through the portion of the second clamping hole 1112 located on the side wall of the groove structure until the sliding block 3 is in clamping fit with the second clamping hook 212.

The quick-release assembly provided by the present application is simple in structure and firm in clamping-fit. When the quick-release assembly is used, the user can release locking between the first main body and the second main body only by lightly pressing the quick-release button 5, so that the first main body and the second main body can be quickly and conveniently assembled and disassembled, and the quick-release assembly is convenient and quick to use and convenient to store.

Therefore, by simplifying the structure of the quick-release assembly, quick assembly and disassembly between connected main bodies using the quick-release assembly are facilitated.

When the quick-release assembly provided by the present application is used in the virtual reality device to connect the virtual reality device main body 1 with the wearable apparatus 2, the wearable apparatus 2 and the virtual reality device main body 1 can be quickly and conveniently assembled and disassembled through the quick-release assembly. On this basis, the virtual reality device can provide various wearable apparatuses 2 with different sizes and different functions for the user, so that the user can quickly and conveniently install and use the virtual reality device by himself/herself Therefore, matching and requirements of different users, even users with different head shapes and facial shapes are greatly met.

Meanwhile, the quick-release assembly provided by the present application is simple in structure and firm in clamping-fit, and the user can replace the head-mounted apparatus only by lightly pressing the quick-release button 5. According to the structure, the virtual reality device is convenient and fast to use, the user can conveniently store the virtual reality device, the assembling operation during production by a manufacturer can be simplified, the product packaging size is reduced, and therefore the packaging and transporting cost is reduced.

It should be noted that when the first main body is the virtual reality device main body 1 and the second main body is the wearable apparatus 2, the installation main body 11 and a shell of the virtual reality device main body 1 may be of an integrated structure. The first clamping hook 211 may be a lug, and the first clamping hole 1111 is a lug clamping hole corresponding to the lug; the second clamping hook 212 is a Z-shaped clamping hook, the second clamping hole 1112 is a Z-shaped clamping hole. Of course, the first clamping hook 211, the second clamping hook 212, the first clamping hole 1111 and the second clamping hole 1112 may also be of other structures, which will not be repeated herein.

Figure 10:
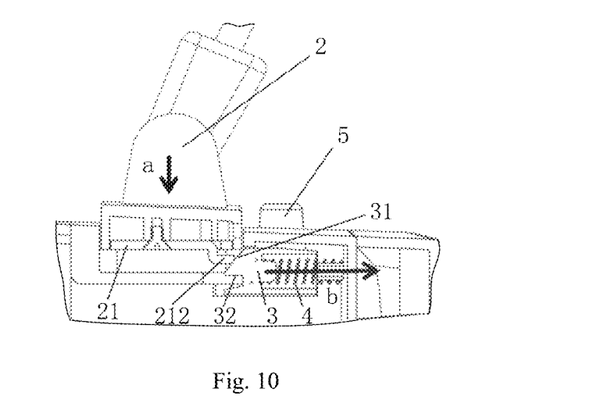
FIG. 10 is an assembly schematic diagram of a virtual reality device main body and a wearable apparatus provided by an embodiment of the present application.
Figure 11:
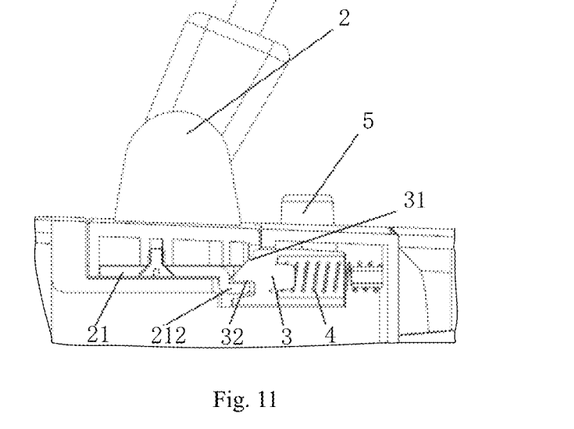
FIG. 11 is an assembly schematic diagram of a virtual reality device main body and a wearable apparatus provided by an embodiment of the present application.

On the basis of the technical solution, an optional implementation is now provided, as shown in FIG. 10 and FIG. 11, a quick-release clamping hook is formed on a side of the sliding block 3 facing the second clamping hole 1112, quick-release clamping hook includes a first contact face 31 and a second contact face 32, the first contact face 31 is an inclined plane, a distance between the first contact face 31 and the second contact face 32 is gradually increased along a direction from the first clamping hole 1111 to the second clamping hole 1112, and the second contact face 32 forms a clamping surface for clamping the second clamping hook 212.

Referring to FIG. 10 and FIG. 11, after the quick-release clamping plate 21 is arranged in the groove structure 111 and the first clamping hook 211 is in clamping fit with the first clamping hole 1111, the second clamping hook 212 can be driven by an external force applied by the user to continuously move downwards in the direction perpendicular to the bottom of the groove structure 111 (such as the direction a in FIG. 10). In this process, the second clamping hook 212 makes contact with the first contact face 31 of the sliding block 3 firstly, and due to the fact that the first contact face 31 is an inclined plane, the quick-release clamping hook of the sliding block 3 does not block the movement of the second clamping hook 212.

Moreover, as the second clamping hook 212 continuously extrudes the first contact face 31, the horizontal component force of the second clamping hook 212 on the first contact face 31 can act on the first contact face 31, so that the portion of the sliding block 3 located in the groove structure 111 is driven to gradually move out of the groove structure 111 through the portion of the second clamping hole 1112 located on the side wall of the groove structure, as shown in the direction b in FIG. 10. It should be noted that in the moving process of the sliding block 3, the elastic member 4 is gradually compressed to store energy.

After the second clamping hook 212 is separated from the first contact face 31, the quick-release clamping hook is driven by the elastic member 4 to be switched from the unlocking station to the locking station, at this moment, the second contact face 32 is in clamping fit with the second clamping hook 212 to complete the clamping-fit operation on the quick-release clamping plate 21, as shown in FIG. 11.

It should be noted that a containing groove may be formed on a side of the sliding block 3 facing the second clamping hook 212. After the sliding block 3 is in clamping fit with the second clamping hook 212, the second clamping hook 212 is placed in the containing groove, and a side wall of a side of the containing groove forms the second contact face 32 in the technical solution.

On the basis of the technical solution, an installation column 112 extending in the second direction is formed on the installation main body 11, a sliding groove 33 extending in the first direction is formed for the quick-release sliding block 3, the sliding groove 33 is an elongated hole extending in the first direction, and the quick-release sliding block 3 is installable on the installation column 112 in a sliding manner in the first direction through the sliding groove 33.

On the basis of the technical solution, a fixing mode of the sliding block 3 is now provided, referring to FIG. 6, FIG. 7, FIG. 8 and FIG. 9, each of screws 6 is installed at an end of the installation column 112 facing away from the installation main body 11, a surface of a side of a screw cap of each of the screws 6 facing the installation column 112 forms a limiting face used for preventing the sliding block 3 from being disengaged from the installation column 112, and a gap is reserved between the limiting face and the sliding block 3 at the locking station.

It should be noted that due to the fact that a gap is reserved between the screw cap of each of the screws 6 and the sliding block 3 at the unlocking station, the sliding block 3 cannot be disengaged from the installation column 112 and can linearly slide in the first direction along the sliding groove 33 through the structure.

Figure 7:
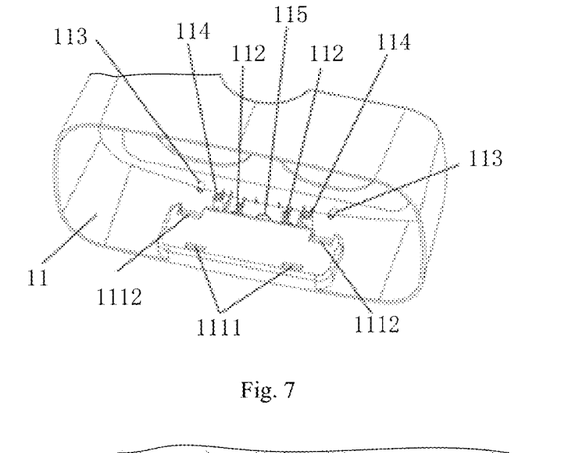
FIG. 7 is a structural schematic diagram of a quick-release assembly provided by an embodiment of the present application.
Figure 8:
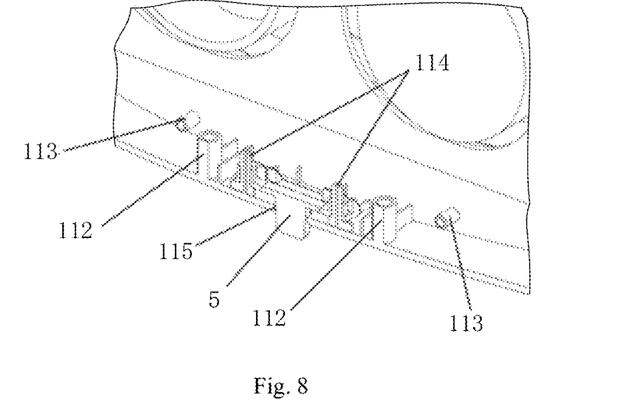
FIG. 8 is a structural schematic diagram of a quick-release assembly provided by an embodiment of the present application.

On the basis of the technical solution, optionally, the elastic member 4 is a spring, a limiting column 113 extending in the first direction is formed on the installation main body 11, an end of the spring sleeves the limiting column 113, and another end of the spring is butted against the sliding block 3, as shown in FIG. 7 to FIG. 9.

On the basis of the technical solution, in order to improve the reaction speed of the sliding block 3 moving in the first direction when the user presses the quick-release button 5, an implementation is now provided: when the sliding block is at the locking station, the spring is in an energy storage state.

On the basis of the technical solution, in order to prevent the spring from shifting in the compression process, in some embodiments, a containing cavity is formed for the sliding block 3, a limiting protrusion is formed at a bottom of the containing cavity, an end of the spring sleeves the limiting column 113, and another end of the spring sleeves the limiting protrusion.

On the basis of the technical solution, an optional implementation is now provided: as shown in FIG. 7 to FIG. 9, a guide column 114 and a button hole 115 are formed on the installation main body 11, the quick-release button 5 is installable on the guide column 114 in a sliding manner in the second direction, the quick-release button 5 partially extends out of the button hole 115, and the quick-release button 5 has a pressed state and a released state. When the quick-release button 5 is in the pressed state, the sliding block 3 is at the unlocking station.

A first guide face 51 is formed on a side of the quick-release button 5 facing the sliding block 3, a surface of the sliding block 3 facing the quick-release button 5 forms a second guide face 34 facing the first guide face, and when the quick-release button 5 is switched between the pressed state and the released state in the second direction, the quick-release sliding block 3 slides in the first direction.

It should be noted that the number of the first clamping hooks 211 may be two, the number of the second clamping hooks 212 may also be two, the number of the quick-release clamping hooks may also be two due to the fact that the quick-release clamping hooks on the sliding block 3 are used for being in clamping fit with the second clamping hooks 212, and certainly, under the condition that the sliding block 3 is in stable clamping fit with the quick-release clamping plate 21, the condition that the number of the second clamping hooks 212 is larger than the number of the quick-release clamping hooks exists.

Now, description is made by taking the first clamping hook 211 being a lug clamping hook, the first clamping hole 1111 being a lug clamping hole corresponding to the lug clamping hook, the second clamping hook 212 being a Z-shaped clamping hook, the second clamping hole 1112 being a Z-shaped clamping hole, and the wearable apparatus 2 being a head-mounted apparatus as an example.

Firstly, the assembly implementation of the quick-release assembly on the virtual reality device is described as follows.

As shown in FIG. 8, the quick-release button 5 is installed in the button hole 115 through the guide column 114 on the virtual reality device main body 1, and the quick-release button 5 can do linear motion in the second direction.

As shown in FIG. 8 and FIG. 9, after the quick-release button 5 is installed, the spring is installed on the limiting column 113 on the virtual reality device main body 1, meanwhile, the sliding block 3 is installed on the virtual reality device main body 1 along the direction of the installation column 112, and it is ensured that the spring is butted against the sliding block 3 and is pre-compressed to a certain extent. Finally, the screws 6 are locked on the installation columns 112 of the virtual reality device main body 1 so as to limit the sliding block 3. At this point, the assembly of the quick-release assembly on the virtual reality device main body 1 is completed.

As shown in FIG. 3, the head-mounted apparatus is provided with a quick-release clamping plate 21, a side of the quick-release clamping plate 21 is provided with lug clamping hooks, and another side of the quick-release clamping plate 21 is provided with Z-shaped clamping hooks.

Figure 5:
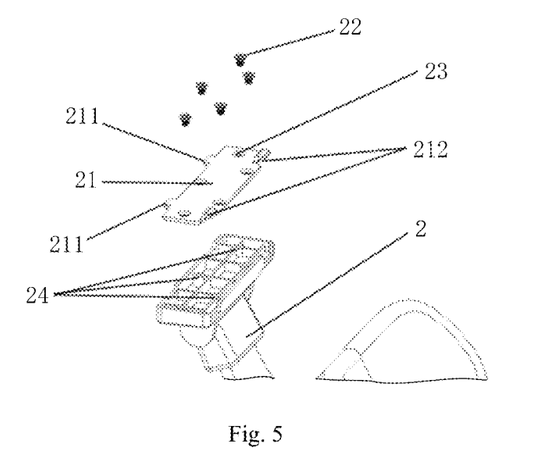
FIG. 5 is an exploded view of a structure in FIG. 3.

It should be noted that the quick-release clamping plate 21 can be locked on the head-mounted apparatus through screws 22, a through hole 23 for each screw 22 to pass through is formed in the quick-release clamping plate 21, and fixing columns 24 used for installing the screws 22 are formed on the head-mounted apparatus, as shown in FIG. 5.

A rapid installation process of the head-mounted apparatus and the virtual reality device main body 1 is described as follows.

As shown in FIG. 4, the lug clamping hooks on the head-mounted apparatus are inserted into the lug clamping holes. Referring to FIG. 10, the head-mounted apparatus is pressed in the direction a, so that the horizontal component force of a Z-shaped clamping hook on the head-mounted apparatus acts on the first contact face 31 on the sliding block 3 and pushes the sliding block 3 to slide backwards. After the head-mounted apparatus is assembled in place, the Z-shaped clamping hook is separated from the first contact face 31 on the sliding block 3, the sliding block 3 rapidly slides back to an initial position under the elastic force action of the spring, and the second contact face 32 of the clamping hook is in clamping fit with the Z-shaped clamping hook, so that rapid installation of the head-mounted apparatus and the virtual reality device main body 1 is completed, as shown in FIG. 11.

A process for quickly detaching the head-mounted apparatus from the virtual reality device main body 1 is described as follows.

Figure 12:
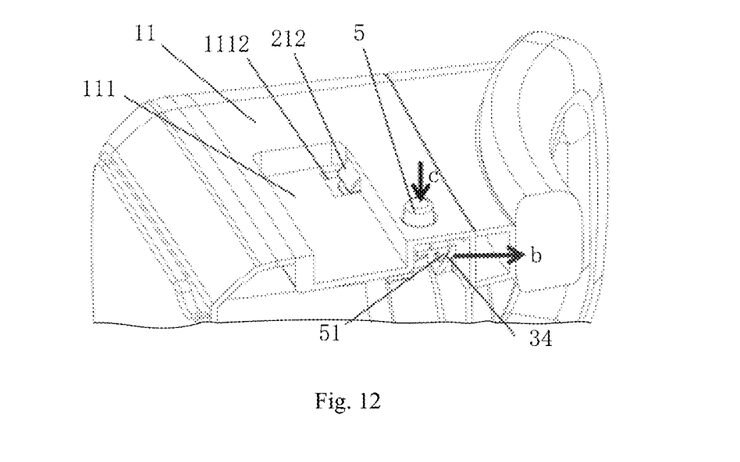
FIG. 12 is a disassembly schematic diagram of a virtual reality device main body and a wearable apparatus provided by an embodiment of the present application.
Figure 13:
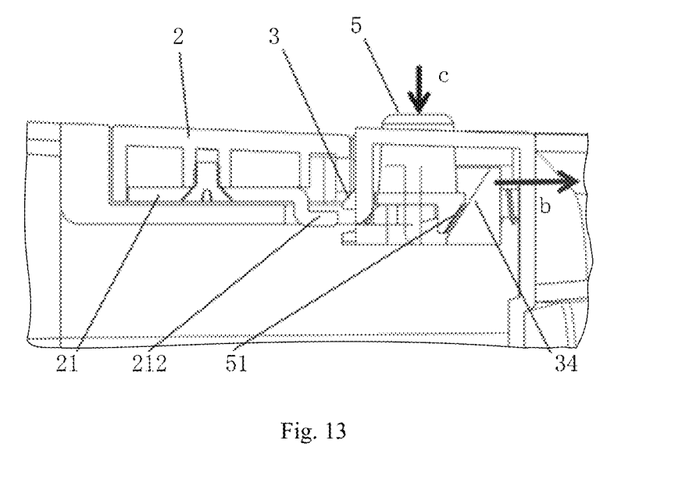
FIG. 13 is a disassembly schematic diagram of a virtual reality device main body and a wearable apparatus provided by an embodiment of the present application.

As shown in FIG. 12, the quick-release button 5 is pressed by a finger in the direction c, the horizontal component force of the first guide face of the quick-release button 5 acts on the second guide face 34 on the sliding block 3, and pushes the whole sliding block 3 to slide in the direction b. In such a way, the second contact face 32 of the quick-release clamping hook of the sliding block 3 is enabled to be separated from the Z-shaped clamping hook, so that the head-mounted apparatus is separated from the virtual reality device main body 1 (as shown in FIG. 13), and the disassembly is realized.

Obviously, those skilled in the art can make various modifications and variants on embodiments of the present application without departing from the spirit and scope of the present application. In this way, if these modifications and variants of the present application fall within the scope of the claims of the application and their equivalent technologies, the present application is also intended to include these modifications and variants.

What is claimed is:

1. A quick-release assembly, comprising:
an installation main body and a quick-release clamping plate, wherein one of the installation main body and the quick-release clamping plate is configured to be connected with a first main body, and the other one is configured to be connected with a second main body;
the installation main body is provided with a groove structure, at least one first clamping hole is formed in a first side of the groove structure in a first direction, at least one second clamping hole is formed in a second side opposite to the first side of the groove structure in the first direction, and a portion of the second clamping hole is located on a side wall of the groove structure;
the quick-release clamping plate matches the groove structure, a first clamping hook matching the first clamping hole is formed on a first side of the quick-release clamping plate, and a second clamping hook corresponding to the second clamping hole in shape is formed on a second side opposite to the first side of the quick-release clamping plate;
the installation main body is provided with a sliding block installable on the installation main body in a sliding manner in the first direction, the sliding block has a locking station and an unlocking station, at the locking station, the sliding block extends into the groove structure from the portion of the second clamping hole located on the side wall of the groove structure to be in clamping fit with the second clamping hook, and at the unlocking station, the sliding block moves out of the groove structure from the second clamping hole;

the installation body is also provided with an elastic member butting between the sliding block and the installation body, and the elastic member is configured to provide a driving force for the sliding block to be switched from the unlocking station to the locking station;

the installation body is also provided with a quick-release button capable of sliding in a second direction perpendicular to a groove bottom of the groove structure, and the quick-release button is configured to push the sliding block to be switched from the locking station to the unlocking station;

wherein an installation column extending in the second direction is formed on the installation main body, a sliding groove extending in the first direction is formed for the quick-release sliding block, and the quick-release sliding block is installable on the installation column in a sliding manner in the first direction through the sliding groove;

wherein a screw is installed at an end of the installation column facing away from the installation main body, a surface of a side of a screw cap of the screw facing the installation column forms a limiting face for preventing the sliding block from being disengaged from the installation column, and a gap is reserved between the limiting face and the sliding block at the locking station.

2. The quick-release assembly according to claim 1, wherein a quick-release clamping hook is formed on a side of the sliding block facing the second clamping hole, the quick-release clamping hook comprises a first contact face and a second contact face, the first contact face is an inclined plane, a distance between the first contact face and the second contact face is gradually increased along a direction from the first clamping hole to the second clamping hole, and the second contact face forms a clamping surface for clamping the second clamping hook.

3. The quick-release assembly according to claim 1, wherein the elastic member is a spring, a limiting column extending in the first direction is formed on the installation main body, an end of the spring sleeves the limiting column, and another end of the spring is butted against the sliding block.

4. The quick-release assembly according to claim 3, wherein when the sliding block is at the locking station, the spring is in an energy storage state.

5. The quick-release assembly according to claim 4, wherein a containing cavity is formed for the sliding block, a limiting protrusion is formed at a bottom of the containing cavity, an end of the spring sleeves the limiting column, and another end of the spring sleeves the limiting protrusion.

6. The quick-release assembly according to claim 1, wherein a guide column and a button hole are formed on the installation main body, the quick-release button is installable on the guide column in a sliding manner in the second direction, the quick-release button partially extends out of the button hole, the quick-release button has a pressed state and a released state, and when the quick-release button is in the pressed state, the sliding block is at the unlocking station.

7. The quick-release assembly according to claim 6, wherein a first guide face is formed on a side of the quick-release button facing the sliding block, and a surface of the sliding block facing the quick-release button forms a second guide face facing the first guide face, and when the quick-release button is switched between the pressed state and the released state in the second direction, the quick-release sliding block slides in the first direction.

8. A virtual reality device, comprising a virtual reality device main body, a wearable apparatus and a quick-release assembly, wherein the quick-release assembly comprises an installation main body and a quick-release clamping plate, one of the installation main body and the quick-release clamping plate is configured to be connected with the virtual reality device main body, and the other one is configured to be connected with the wearable apparatus;

the installation main body is provided with a groove structure, at least one first clamping hole is formed in a first side of the groove structure in a first direction, at least one second clamping hole is formed in a second side opposite to the first side of the groove structure in the first direction, and a portion of the second clamping hole is located on a side wall of the groove structure;

the quick-release clamping plate matches the groove structure, a first clamping hook matching the first clamping hole is formed on a first side of the quick-release clamping plate, and a second clamping hook corresponding to the second clamping hole in shape is formed on a second side opposite to the first side of the quick-release clamping plate;

the installation main body is provided with a sliding block installable on the installation main body in a sliding manner in the first direction, the sliding block has a locking station and an unlocking station, at the locking station, the sliding block extends into the groove structure from the portion of the second clamping hole located on the side wall of the groove structure to be in clamping fit with the second clamping hook, and at the unlocking station, the sliding block moves out of the groove structure from the second clamping hole;

the installation body is also provided with an elastic member butting between the sliding block and the installation body, and the elastic member is configured to provide a driving force for the sliding block to be switched from the unlocking station to the locking station; the installation body is also provided with a quick-release button capable of sliding in a second direction perpendicular to a groove bottom of the groove structure, and the quick-release button is configured to push the sliding block to be switched from the locking station to the unlocking station;

wherein an installation column extending in the second direction is formed on the installation main body, a sliding groove extending in the first direction is formed for the quick-release sliding block, and the quick-release sliding block is installable on the installation column in a sliding manner in the first direction through the sliding groove;

wherein a screw is installed at an end of the installation column facing away from the installation main body, a surface of a side of a screw cap of the screw facing the installation column forms a limiting face for preventing the sliding block from being disengaged from the installation column, and a gap is reserved between the limiting face and the sliding block at the locking station.

9. The virtual reality device according to claim 8, wherein a quick-release clamping hook is formed on a side of the sliding block facing the second clamping hole, the quick-release clamping hook comprises a first contact face and a second contact face, the first contact face is an inclined plane, a distance between the first contact face and the second contact face is gradually increased along a direction from the first clamping hole to the second clamping hole, and the second contact face forms a clamping surface for clamping the second clamping hook.

10. The virtual reality device according to claim 8, wherein the elastic member is a spring, a limiting column extending in the first direction is formed on the installation main body, an end of the spring sleeves the limiting column, and another end of the spring is butted against the sliding block.

11. The virtual reality device according to claim 10, wherein when the sliding block is at the locking station, the spring is in an energy storage state.

12. The virtual reality device according to claim 11, wherein a containing cavity is formed for the sliding block, a limiting protrusion is formed at a bottom of the containing cavity, an end of the spring sleeves the limiting column, and another end of the spring sleeves the limiting protrusion.

13. The virtual reality device according to claim 8, wherein a guide column and a button hole are formed on the installation main body, the quick-release button is installable on the guide column in a sliding manner in the second direction, the quick-release button partially extends out of the button hole, the quick-release button has a pressed state and a released state, and when the quick-release button is in the pressed state, the sliding block is at the unlocking station.

14. The virtual reality device according to claim 13, wherein a first guide face is formed on a side of the quick-release button facing the sliding block, and a surface of the sliding block facing the quick-release button forms a second guide face facing the first guide face, and when the quick-release button is switched between the pressed state and the released state in the second direction, the quick-release sliding block slides in the first direction.

* * * * *